United States Patent
Gu

(10) Patent No.: US 10,506,283 B2
(45) Date of Patent: Dec. 10, 2019

(54) VIDEO DECODING AND RENDERING USING COMBINED JITTER AND FRAME BUFFER

(71) Applicant: Cybrook Inc., Santa Clara, CA (US)

(72) Inventor: Qunshan Gu, Santa Clara, CA (US)

(73) Assignee: Cybrook Inc., Santa Clara, CA (US)

( * ) Notice: Subject to any disclaimer, the term of this patent is extended or adjusted under 35 U.S.C. 154(b) by 450 days.

(21) Appl. No.: 14/982,731

(22) Filed: Dec. 29, 2015

(65) Prior Publication Data

US 2017/0142434 A1 May 18, 2017

Related U.S. Application Data

(63) Continuation-in-part of application No. 14/944,380, filed on Nov. 18, 2015.

(51) Int. Cl.
| | | |
|---|---|---|
| *H04N 19/44* | (2014.01) | |
| *H04N 19/423* | (2014.01) | |
| *H04N 19/65* | (2014.01) | |
| *H04N 21/44* | (2011.01) | |

(52) U.S. Cl.
CPC ............................. *H04N 21/44004* (2013.01)

(58) Field of Classification Search
CPC .... H04N 19/176; H04N 19/159; H04N 19/44; H04N 19/105; H04N 19/30; H04N 19/82; H04N 19/124; H04N 19/17; H04N 19/172; H04N 19/117; H04N 19/119; G10L 19/032; G10L 19/26; G10L 19/02; G10L 19/021; H04L 65/4084; H04L 65/60; H04L 65/80; H04L 65/4069; H04L 12/2854; H04L 65/1069; H04L 65/4076; H04L 65/4092; H04L 65/601; H04L 1/0002; H04L 5/0064; H04L 67/1097; H04L 67/12; H04L 43/0829; H04L 43/0864; H04L 67/28; H04L 49/90

See application file for complete search history.

(56) References Cited

U.S. PATENT DOCUMENTS

| | | |
|---|---|---|
| 5,329,318 A | 7/1994 | Keith |
| 5,398,072 A | 3/1995 | Auld |
| 5,594,736 A | 1/1997 | Tatsumi et al. |
| 5,724,091 A | 3/1998 | Freeman et al. |

(Continued)

FOREIGN PATENT DOCUMENTS

| | | |
|---|---|---|
| CN | 1223192 A | 7/1999 |
| CN | 1321026 A | 11/2001 |

(Continued)

*Primary Examiner* — Dave Czekaj
*Assistant Examiner* — Kehinde Abimbola
(74) *Attorney, Agent, or Firm* — Young Basile Hanlon MacFarlane, P.C.

(57) ABSTRACT

Systems, apparatuses and methods for decoding and encoding a video stream having a plurality of frames using a ring (circular) buffer are disclosed. When decoding, a decoder can receive packets from an encoder and store them in a circular buffer. The circular buffer can store packets until packets comprising complete frames are received. Storing multiple partial or complete frames in a circular buffer removes jitter and permits forward error correction to proceed by efficiently assembling complete frames and minimizing delay.

17 Claims, 7 Drawing Sheets

(56) References Cited

U.S. PATENT DOCUMENTS

| | | | |
|---|---|---|---|
| 6,985,501 B2* | 1/2006 | Suzuki | H04L 12/6418 370/252 |
| 7,042,948 B2 | 5/2006 | Kim et al. | |
| 8,081,635 B2* | 12/2011 | Bekiares | H04N 9/8205 370/389 |
| 9,210,419 B2 | 12/2015 | Barrett et al. | |
| 9,615,087 B2* | 4/2017 | Amon | H04N 5/147 |
| 9,756,356 B2 | 9/2017 | Yang et al. | |
| 9,942,119 B2* | 4/2018 | Kruger | H04J 3/0632 |
| 2002/0009054 A1* | 1/2002 | Suzuki | H04L 12/6418 370/252 |
| 2002/0071654 A1 | 6/2002 | Notoya et al. | |
| 2006/0168104 A1* | 7/2006 | Shimizu | H04L 12/1854 709/218 |
| 2008/0151775 A1* | 6/2008 | Balint | H04L 1/1887 370/253 |
| 2008/0172708 A1 | 7/2008 | Perry et al. | |
| 2009/0070610 A1* | 3/2009 | Nishida | G06F 1/3203 713/322 |
| 2010/0085963 A1* | 4/2010 | Bekiares | H04N 9/8205 370/389 |
| 2010/0165846 A1 | 7/2010 | Yamaguchi et al. | |
| 2011/0280307 A1* | 11/2011 | MacInnis | G06T 9/00 375/240.15 |
| 2011/0289544 A1* | 11/2011 | Goosen | H04N 21/4384 725/116 |
| 2012/0028567 A1* | 2/2012 | Marko | H04W 4/20 455/3.02 |
| 2012/0030769 A1 | 2/2012 | De Laet | |
| 2013/0300940 A1* | 11/2013 | Amon | H04N 5/147 348/700 |
| 2015/0103846 A1 | 4/2015 | Dung Dao | |
| 2016/0234088 A1* | 8/2016 | Kruger | H04J 3/0632 |
| 2017/0070743 A1 | 3/2017 | Zhou | |

FOREIGN PATENT DOCUMENTS

| | | |
|---|---|---|
| CN | 1960315 A | 5/2007 |
| CN | 104375952 A | 2/2015 |
| CN | 104703051 A | 6/2015 |

* cited by examiner

VIDEO DECODING AND RENDERING USING COMBINED JITTER AND FRAME BUFFER

CROSS-REFERENCE TO RELATED APPLICATION(S)

This application is a continuation-in-part to pending U.S. patent application Ser. No. 14/944,380, filed Nov. 18, 2015, the disclosure of which is incorporated herein by reference in its entirety.

TECHNICAL FIELD

This disclosure relates to video encoding and decoding and particularly to video decoding and rendering using a combined jitter and frame buffer.

BACKGROUND

Digital video streams can be encoded to efficiently compress the video into a digital bitstream for storage on non-transitory digital media or streaming transmission through bandwidth-limited communication channels. However, packet loss and other errors may occur during video bitstream transmission or storage, resulting in errors in decoding the bitstream. It is also common that the available channel bandwidth may change from time to time, causing problems in real-time video transmission. Network propagation variances can create jitter in received packet signals, which is the variation in latency, as measured in the variability over time of the packet latency, across a network that should be reduced prior to rendering.

SUMMARY

This disclosure includes aspects of systems, methods and apparatuses for video decoding and rendering using combined jitter and frame buffer.

In one aspect, this disclosure includes a method for reducing jitter in decoding a video bitstream with a computing device, comprising receiving packets associated with an encoded frame in the video bitstream, storing the packets associated with the encoded frame in a memory of the computing device configured as a circular buffer, in response to a determination that all packets associated with the encoded frame have been stored in the circular buffer, immediately decoding the encoded frame, and rendering the decoded frame at a speed that is faster than real time.

In another aspect, this disclosure includes an apparatus for reducing jitter in a video bitstream, comprising a memory and a processor. The memory comprises storage structured as a circular buffer configured to receive packets associated with an encoded frame included in the video bitstream. The processor is configured to execute instructions stored in the memory to receive packets associated with an encoded frame in the video bitstream, store the packets associated with the encoded frame in the memory, in response to a determination that all necessary packets associated with the encoded frame have been stored in the circular buffer, immediately decode the encoded frame, and render the decoded frame at a speed that is potentially faster than real-time from the point of view of waiting time.

In another aspect, this disclosure includes a system for reducing jitter in decoding a video bitstream comprising a forward error correction decoder, a video decoder and a renderer. The video decoder is configured to receive packets associated with an encoded frame in the video bitstream, store the packets associated with the encoded frame in a circular buffer, and in response to a determination that all packets (such as all necessary packets) associated with the encoded frame have been stored in the circular buffer, immediately decode the encoded frame. The renderer is configured to render the decoded frame, wherein the rendering occurs at a speed that is faster than real time from the point of view of waiting time.

These and other aspects are described in additional detail below.

BRIEF DESCRIPTION OF THE DRAWINGS

The following detailed description is best understood when read in conjunction with the accompanying drawings. Various features of the drawings are not to-scale. To the contrary, the dimensions of the various features may be arbitrarily expanded or reduced for clarity.

DETAILED DESCRIPTION

Figure 1:
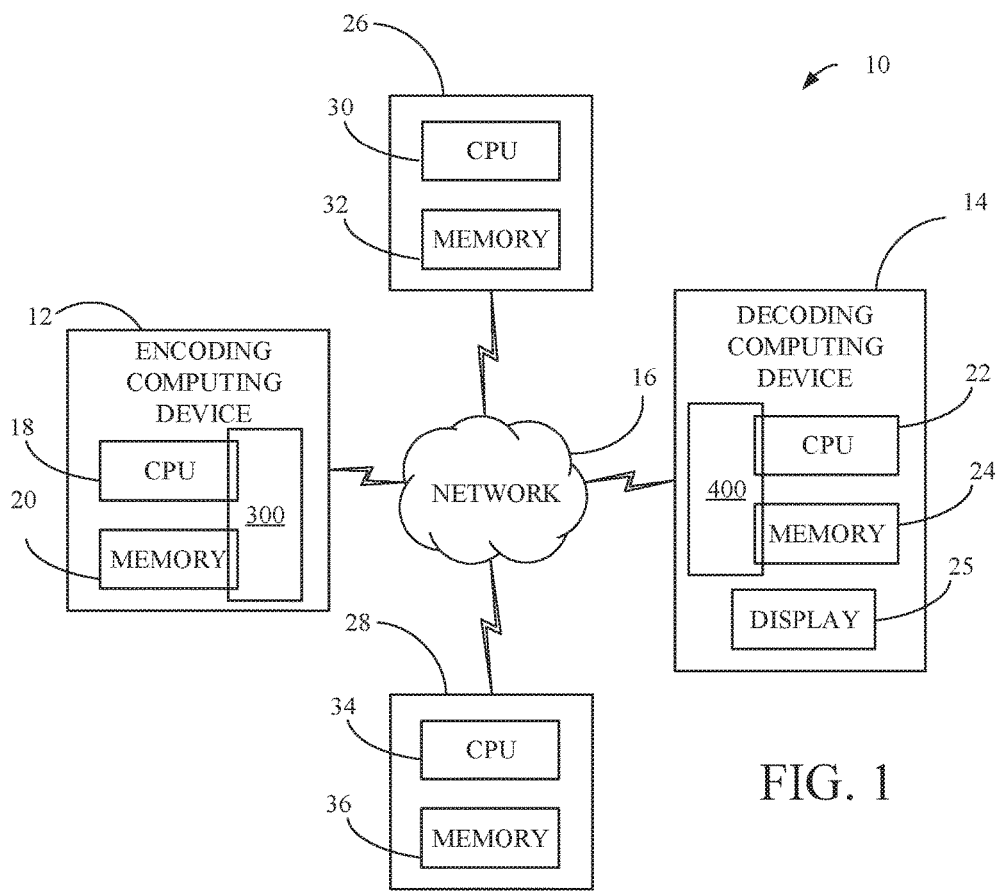
FIG. 1 is a block diagram of a video encoding and decoding system in accordance with aspects of disclosed implementations.

Digital video can be used for entertainment, video conferencing, advertising and general information sharing. User expectation for digital video quality can be high, as users expect video over shared internet networks with limited bandwidth to have the same high spatial and temporal quality as video broadcast over dedicated cable channels. Digital video encoding can compress a digital video bitstream to permit high quality digital video to be transmitted over a network having limited bandwidth, for example. Digital video quality can be defined as the degree to which output decompressed and decoded digital video matches the input digital video, for example.

Video encoding and decoding incorporate techniques that compress and decompress digital video streams to permit transmission of high quality digital video streams over networks that can have limited bandwidth capability. These techniques can treat digital video streams as sequences of blocks of digital data and process the blocks to compress the data for transmission or storage and, once received, decompress the blocks to re-create the original digital video stream.

To remove jitter and reduce latency due to limited bandwidth, traditional video networking applications employ a packet jitter buffer, which may create a permanent delay in the system. Aspects of this disclosure can permit combination of the packet jitter buffer with a dedicated frame buffer to remove jitter and reduce latency jointly. In one implementation, the packet jitter buffer employs a circular buffer array, with each circular buffer of the array hosting one or more packets associated to a single frame. When all packets, such as all necessary packets belonging to the single frame are received, the circular buffer immediately transmits them to a decoder to decode. Decoded frames, each assigned with a timestamp, are further transmitted to a render buffer array of a renderer. The renderer renders a frame in the render buffer array at a speed that is slightly faster (e.g., 1% or 3%) than real displaying time, based on the timestamp difference of the current frame and an immediately previous frame.

Systems, apparatuses and methods for decoding and encoding a video stream having a plurality of frames using a circular buffer (also referred to herein as a "ring buffer") are disclosed. When decoding, a decoder can receive packets from an encoder and store them in a circular buffer. The circular buffer can store packets until packets comprising a complete frame are received. Storing multiple partial or complete frames in a circular buffer array removes jitter and permits forward error correction to proceed by efficiently assembling complete frames and minimizing delay.

Aspects of disclosed implementations can permit transmission of compressed video bitstreams over "noisy" or potentially error inducing networks by performing forward error correction (FEC) on the packets of the video bitstream. Aspects can add FEC packets to the video bitstream to permit detection and correction of missing or corrupt packets. By receiving packets of an FEC protected video bitstream using a circular buffer, aspects can efficiently gather all of the packets belonging to a frame of the video bitstream and emit frames to be FEC decoded.

FEC can, in some cases, reconstruct missing or corrupt packets of a frame using other packets of the frame without requiring retransmission of packets, thereby reducing roundtrip delay. In other instances, missing or corrupt packets cannot be reconstructed by FEC. In these instances, missing or out of order packets can be detected by the circular buffer when a packet from a frame with a frame number greater than the frame number of the oldest frame in the circular buffer is received by the circular buffer before the frame with an oldest frame number is complete. This means that either packets have been lost in transmission or are being sent out of order. When this occurs, aspects of disclosed implementations can briefly halt the transmission of frames from the circular buffer to the FEC decoder. Transmission of frames can be temporarily halted until either the missing packets associated with the oldest frame number are received or a subsequent frame is complete. If the missing packets associated with the oldest frame are received before a subsequent frame is complete, the oldest frame can be transmitted to the FEC decoder. If the missing packets are not received before all the packets associated with a subsequent frame are received by the circular buffer, the incomplete frame or frames with frame numbers older than the complete subsequent frame can be deleted and the complete subsequent frame can be transmitted to the FEC decoder.

Discarding frames having incomplete or corrupt packets can increase the performance of video encoding and decoding by eliminating the need for retransmission of video data.

In cases where re-transmission is required, a message can be passed from the decoder to the encoder via the network and the encoder can then re-transmit the missing frame. This roundtrip messaging and re-transmission of data can result in gaps and delays in the decoded video stream, for example. Aspects of disclosed implementations discard incomplete frames without requiring re-transmission of data, thereby avoiding roundtrip delays.

One problem is that discarded frame or frames can be later required by the decoder in performing inter-prediction. Aspects of disclosed implementation can avoid this by, for example, only using the good reference frames in the decoder buffer on the encoder side so that the discarded frame or frames will not be used by the inter prediction. Whether a frame is successfully reconstructed in the decoder buffer can be determined, for example, by the circular buffer and the decoder, and signaled by the back-channel message to the encoder.

FIG. 1 is a schematic of a video encoding and decoding system 10 in which aspects of the invention can be implemented. A computing device 12, in one example, can include an internal configuration of hardware including a processor such as a central processing unit (CPU) 18 and a digital data storage exemplified by memory 20. CPU 18 can a controller for controlling the operations of computing device 12, and may be a microprocessor, digital signal processor, field programmable gate array, discrete circuit elements laid out in a custom application specific integrated circuit (ASIC), or any other digital data processor, for example. CPU 18 can be connected to memory 20 by a memory bus, wires, cables, wireless connection, or any other connection, for example. Memory 20 may be or include read-only memory (ROM), random access memory (RAM), optical storage, magnetic storage such as disk or tape, non-volatile memory cards, cloud storage or any other manner or combination of suitable digital data storage device or devices. Memory 20 can store data and program instructions that are used by CPU 18. Other suitable implementations of computing device 12 are possible. For example, the processing of computing device 12 can be distributed among multiple devices communicating over multiple networks 16. In FIG. 1, the computing device 12 may be an encoding computing device, i.e., a computing device comprising an encoder. The encoding computing device 12 incorporates encoder elements 300 and processes that may incorporate hardware and software elements and associated algorithms to implement the encoding device 12, as described in more detail below.

In one example, a network 16 can connect computing device 12 and computing device 14 for encoding and decoding a video stream. For example, the video stream can be encoded in computing device 12 and the encoded video stream is decoded in computing device 14. Network 16 may include any network or networks that are appropriate to the application at hand, such as wired or wireless local or wide area networks, virtual private networks, cellular telephone data networks, or any other wired or wireless configuration of hardware, software, communication protocol suitable to transfer a video bitstream from computing device 12 to computing device 14 and communicate parameters regarding the network from computing device 14 to computing device 12 in the illustrated example.

Computing device 14 can includes CPU 22 and memory 24, which can be similar to components as discussed above in conjunction with the system 12. Computing device 14 can be a decoding computing device 14 that incorporates decoder elements 400 and processes that may incorporate hardware and software elements and associated algorithms to implement the decoding device 14, as described in more detail below, and configured to display a video stream, for example. A display 25 may be connected to computing device 14 and can be implemented in various ways, including by a liquid crystal display (LCD), a cathode-ray tube (CRT), organic or non-organic light emitting diode display (LED), plasma display, or any other mechanism to display a machine-readable video signal to a user. Computing device 14 can be configured to display a rendering of the video bitstream decoded by a decoder in computing device 14, for example.

Other implementations of encoder and decoder system 10 are possible. In addition to computing device 12 and computing device 14, FIG. 1 shows additional computing devices 26, 28 each having one or more CPUs 30, 34 and memories 32, 36 respectively. These computing devices can include servers, and mobile phones, which can also create, encode, decode, store, forward or display digital video streams, for example. Each of these computing devices can have differing capabilities in terms of processing power and memory availability, including devices for creating video such as video cameras and devices for displaying video.

Figure 2:
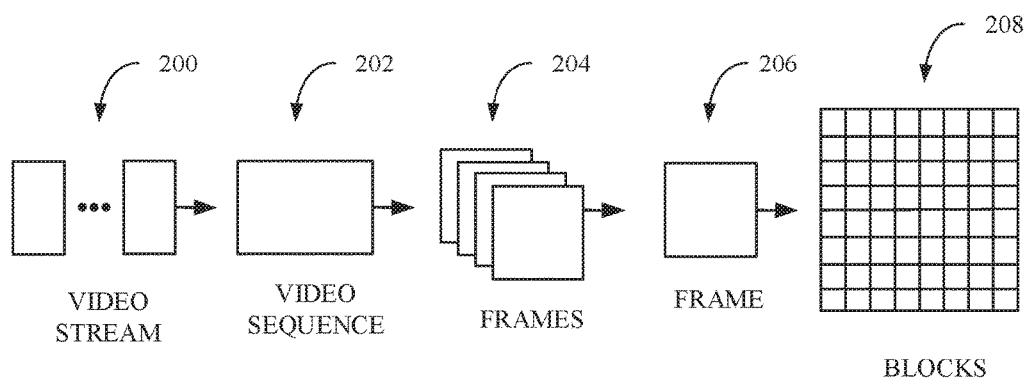
FIG. 2 is a block diagram illustrating a video stream breakdown in accordance with aspects of disclosed implementations.

FIG. 2 is a block diagram illustrating a video stream 200 to be encoded and subsequently decoded. Video stream 200 can include a video sequence 202. A video sequence 200 is a temporally contiguous subset of a video stream, also called a group of pictures (GOP). Video sequence 202 can include a number of adjacent video frames 204. While four frames are depicted in adjacent frames 204, video sequence 202 can include any number of adjacent frames. A single example of the adjacent frames 204 is illustrated as the single frame 206. Further sub-dividing the single frame 206 can yield a series of blocks 208. In this example, blocks 208 can contain data corresponding to an N×M pixel region in frame 206, such as luminance and chrominance data for the corresponding pixels. Blocks 208 can be of any suitable size such as 128×128 pixel groups or any rectangular subset of the pixel group.

Figure 3:
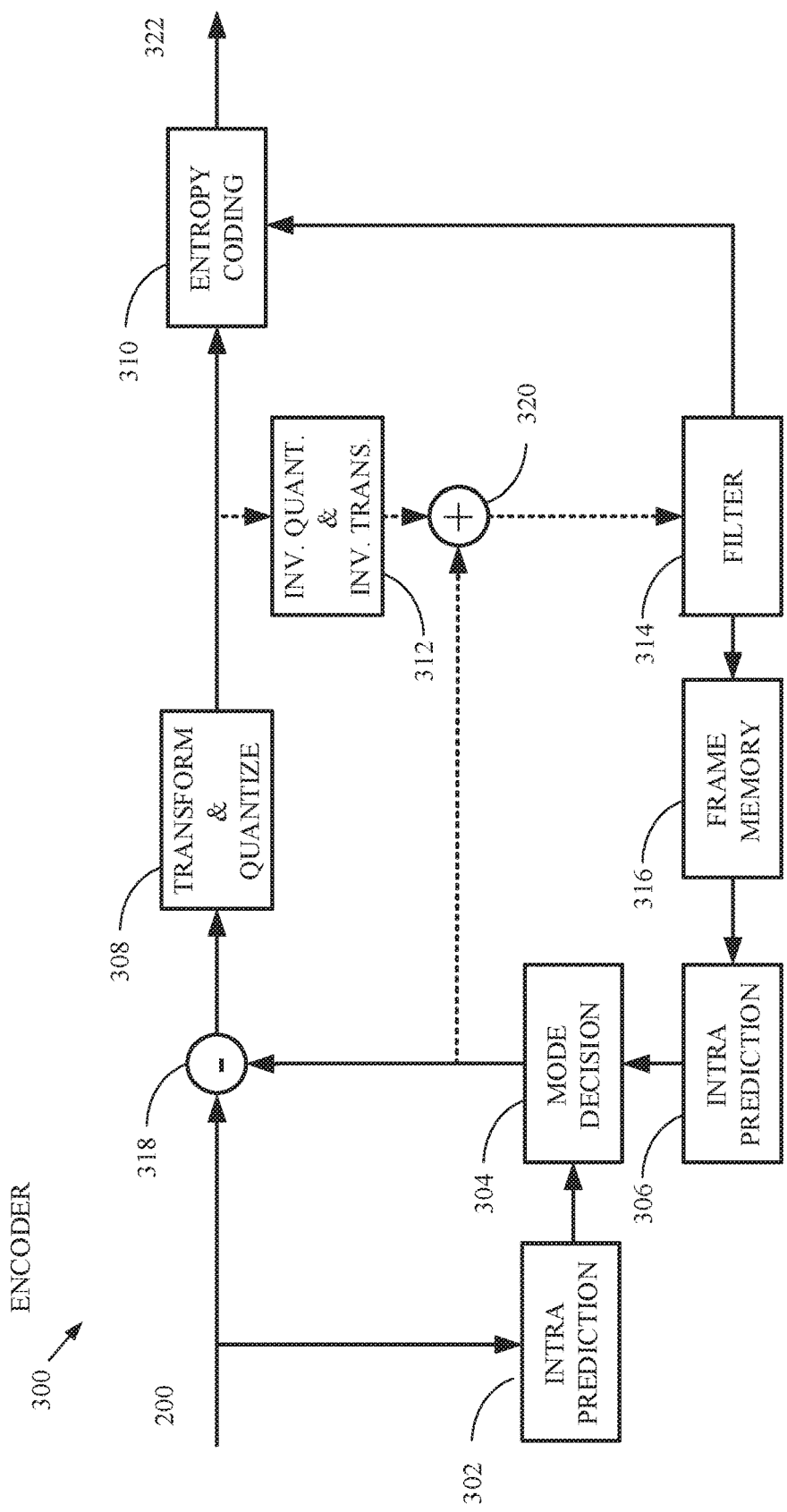
FIG. 3 is a block diagram of a video encoder/compression system in accordance with aspects of disclosed implementations.

FIG. 3 is a block diagram of an encoder 300 in accordance with disclosed implementations. Encoder 300 can be implemented in a computing device such as computing device 12 and may utilize hardware components or software in the form of process algorithms comprising a series of program instructions stored in the memory 18 organized into software modules that execute on the CPU 18. Encoder 300 can encode an input video stream 200. Encoder 300 includes stages to perform the various functions in a forward path to produce an encoded and/or a compressed bitstream 322: an intra prediction stage 302, mode decision stage 304, an inter prediction stage 306, transform and quantization stage 308, a filter stage 314 and an entropy encoding stage 402. Encoder 300 may also include a reconstruction path to reconstruct a frame for prediction and encoding of future blocks. In FIG. 3, encoder 300 includes an inverse quantization and inverse transform stage 312 and a multi-frame memory 316 for storing multiple frames of video data to reconstruct blocks for prediction. Other structural variations of encoder 300 can be used to encode video stream 200.

When video stream 200 is presented for encoding, each frame (such as frame 206 from FIG. 2) within video stream 200 is processed in units of blocks. Each block can be processed separately in raster scan order starting from the upper left hand block. At intra prediction stage 302 intra prediction residual blocks can be determined for the blocks of video stream 200. Intra prediction can predict the contents of a block by examining previously processed nearby blocks to determine if the pixel values of the nearby blocks are similar to the current block. Since video streams 200 are processed in raster scan order, blocks that occur in raster scan order ahead of the current block are available for processing the current block. Blocks that occur before a given block in raster scan order can be used for intra prediction because they will be available for use at a decoder since they will have already been reconstructed. If a nearby block is similar enough to the current block, the nearby block can be used as a prediction block and subtracted 318 from the current block to form a residual block and information indicating that the current block was intra-predicted can be included in the video bitstream.

Video stream 200 can also be inter predicted at inter prediction stage 306. Inter prediction includes forming a residual block from a current block by translating pixels from a temporally nearby frame to form a prediction block that can be subtracted 318 from the current block. Temporally adjacent frames can be stored in frame memory 316 and accessed by inter prediction stage 306 to form a residual block that can be passed to mode decision stage 304 where the residual block from intra prediction can be compared to the residual block from inter prediction. The mode decision stage 302 can determine which prediction mode, inter or intra, to use to predict the current block. Aspects can use rate distortion value to determine which prediction mode to use, for example.

A rate distortion value can be determined by calculating the number or bits per unit time or bit rate of a video bitstream encoded using particular encoding parameter, such as prediction mode, for example, combined with calculated differences between blocks from the input video stream and blocks in the same position temporally and spatially in the decoded video stream. Since encoder 300 is "lossy", pixel values in blocks from the decoded video stream can differ from pixel values in blocks from the input video stream. Encoding parameters can be varied and respective rate distortion values compared in order to determine optimal parameter values, for example.

At subtraction stage 318, the residual block determined by mode decision stage 304 can be subtracted from the current block and passed to transform and quantize stage 308. Since the values of the residual block can be smaller than the values in the current block, the transformed and quantized 308 residual block can have fewer values than the transformed and quantized 308 current block and therefore be represented by fewer transform coefficients in the video bitstream. Examples of block-based transforms include the Karhunen-Loève Transform (KLT), the Discrete Cosine Transform ("DCT"), and the Singular Value Decomposition Transform ("SVD") to name a few. In one example, the DCT transforms the block into the frequency domain. In the case of DCT, the transform coefficient values are based on spatial frequency, with the DC or other lowest frequency coefficient at the top-left of the matrix and the highest frequency coefficient at the bottom-right of the matrix.

Transform and quantize stage 308 converts the transform coefficients into discrete quantum values, which can be referred to as quantized transform coefficients. Quantization can reduce the number of discrete states represented by the transform coefficients while reducing image quality less than if the quantization were performed in the spatial domain rather than a transform domain. The quantized transform coefficients can then entropy encoded by entropy encoding stage 310. Entropy encoding is a reversible, lossless arithmetic encoding scheme that can reduce the number of bits in the video bitstream that can be decoded without introducing change in the bitstream. The entropy-encoded coefficients, together with other information used to decode the block, such as the type of prediction used, motion vectors, quantizer value and filter strength, are then output as a compressed bitstream 322.

The reconstruction path in FIG. 3, shown by the dotted connection lines, can be used to help ensure that both encoder 300 and decoder 400 (described below with reference to FIG. 4) use the same reference frames to form intra prediction blocks. The reconstruction path performs functions that are similar to functions performed during the decoding process discussed in more detail below, including dequantizing and inverse transforming the quantized transform coefficients at inverse quantize and inverse transform stage 312, which can be combined with a residual block from mode decision stage 304 at adder 320 to create a reconstructed block. Loop filter stage 314 can be applied to the reconstructed block to reduce distortion such as blocking artifacts since decoder 400 can filter the reconstructed video stream prior to sampling it to form reference frames. FIG. 3 shows loop filter stage 314 sending loop filter parameters to entropy coder 310 to be combined with output video bitstream 322, to permit decoder 400 to use the same loop filter parameters as encoder 300, for example.

Other variations of encoder 300 can be used to encode compressed bitstream 322. Encoder 300 stages can be processed in different orders or may be combined into fewer stages or divided into more stages without changing the purpose. For example, a non-transform based encoder 300 can quantize the residual signal directly without transform stage. In another implementation, an encoder 300 may have transform and quantize stage 308 divided into a single stage.

Figure 4:
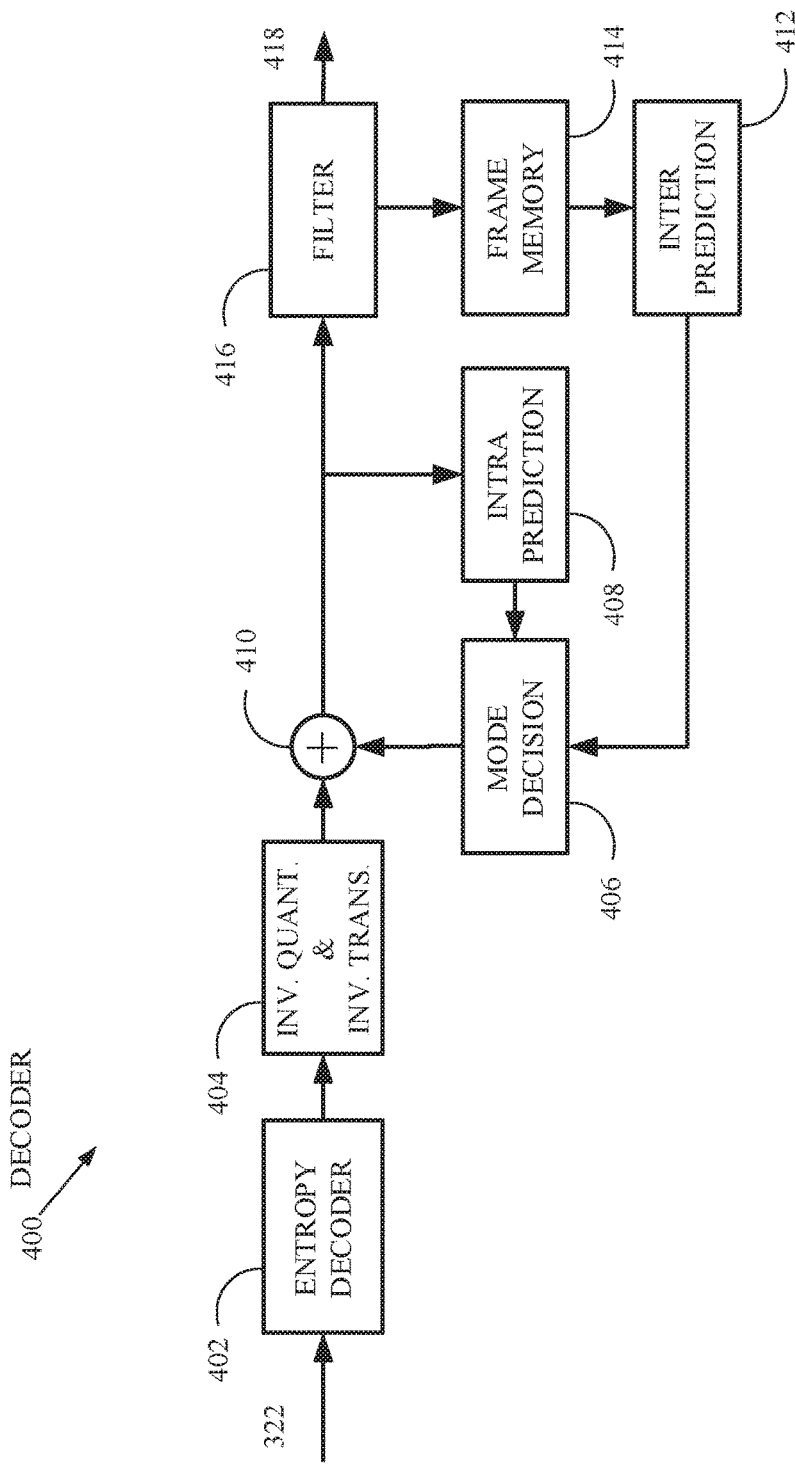
FIG. 4 is a block diagram of a video decoder/decompression system in accordance with aspects of disclosed implementations.

FIG. 4 is a block diagram of decoder 400 in according to aspects of disclosed implementations. In one example, decoder 400 can be implemented in computing device 14. Decoder 400 includes the following stages to perform various functions to produce an output video stream 418 from compressed bitstream 322: entropy decoding stage 402, an inverse quantization and inverse transform stage 404, an intra prediction stage 408, an inter prediction stage 412, an adder 410, a mode decision stage 406 and a frame memory 414. Other structural variations of decoder 400 can be used to decode compressed bitstream 322. For example, inverse quantization and inverse transform stage 404 can be expressed as two separate stages.

Received video bitstream 322 can be entropy decoded by entropy decoder 402. Entropy decoder 402 performs an inverse of the entropy coding performed at stage 310 of the encoder 300 to restore the video bitstream to its original state before entropy coding. The restored video bitstream can then be inverse quantized and inverse transformed in similar fashion to inverse quantize and inverse transform stage 312. Inverse quantize and inverse transform stage 404 can restore residual blocks of the video bitstream 322. Note that since encoder 300 and decoder 400 can represent lossy encoding, the restored residual block can have different pixel values than the residual block from the same temporal and spatial location in the input video stream 200.

Following restoration of residual blocks at inverse quantize and inverse transform stage 404, the residual blocks of the video bitstream can be then restored to approximate its pre-prediction state by adding prediction blocks to the residual blocks at adder 410. Adder 410 receives the prediction block to be added to residual blocks at stage 410 from the mode decision stage 406. Mode decision stage 406 can interpret parameters included in the input video bitstream 322 by encoder 300, for example, to determine whether to use intra or inter prediction to restore a block of the video bitstream 322. Mode decision stage 406 can also perform calculations on the input video bitstream 322 to determine which type of prediction to use for a particular block. By performing the same calculations on the same data as the decoder, mode decision state 406 can make the same decision regarding prediction mode as the encoder 300, thereby reducing the need to transmit bits in the video bitstream to indicate which prediction mode to use.

Mode decision stage 406 can receive prediction blocks from both intra prediction stage 408 and inter prediction stage 412. Intra prediction stage 408 can receive blocks to be used as prediction blocks from the restored video stream output from adder 410 since intra prediction blocks are processed in raster scan order, and since blocks used in intra prediction are selected by encoder 300 to occur in the raster scan order before the residual block to be restored occur, intra prediction stage 408 can provide prediction blocks when required. Inter prediction stage 412 creates prediction blocks from frames stored in frame memory 414 as discussed above in relation to encoder 200. Frame memory 414 receives reconstructed blocks after filtering by loop filter 418. Loop filtering can remove blocking artifacts introduced by block-based prediction techniques such as used by encoder 300 and decoder 400 as described herein.

Inter prediction stage 412 can use frames from frame memory 414 following filtering by loop filter 418 in order to use the same data for forming prediction blocks as was used by encoder 300. Using the same data for prediction permits decoder 400 to reconstruct blocks to have pixel values close to corresponding input blocks in spite of using lossy compression. Prediction blocks from inter prediction stage 412 are received by mode decision stage 406 can be passed to adder 410 to restore a block of video bitstream 322. Following loop filtering by loop filter 416, restored video stream 418 can be output from encoder 400. Other variations of decoder 400 can be used to decode compressed bitstream 322. For example, decoder 400 can produce output video stream 418 without loop filter stage 416.

Figure 5:
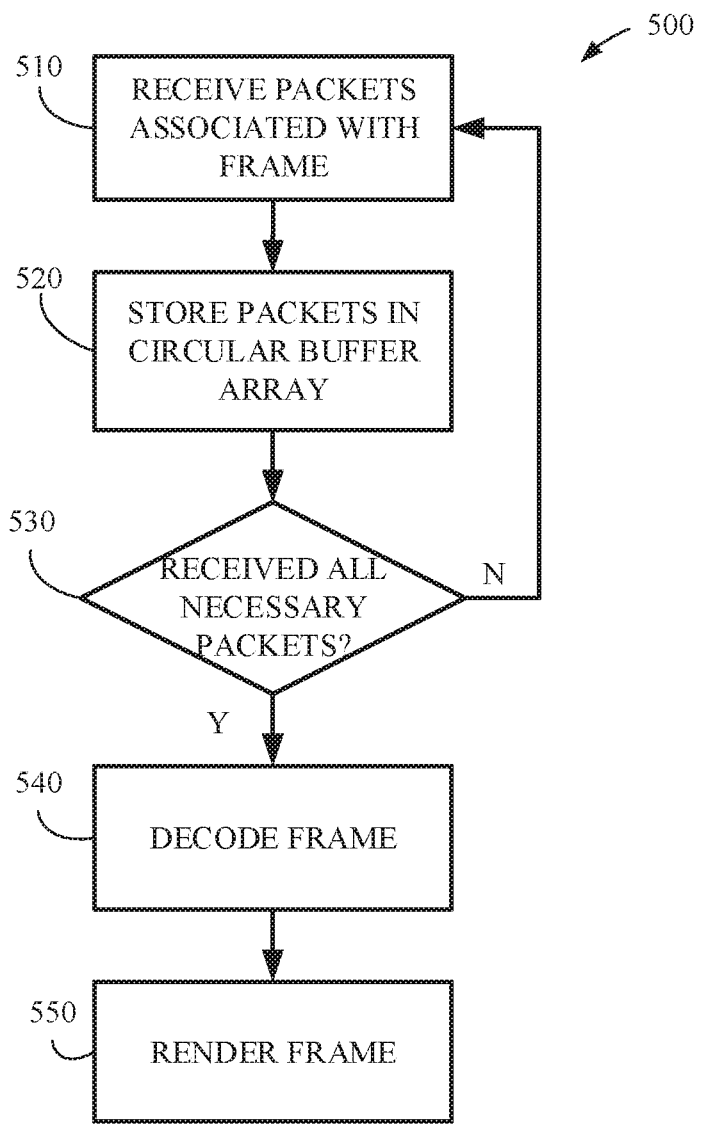
FIG. 5 is a flowchart showing operations to reduce jitter in video decoding processing using a circular buffer in accordance with aspects of disclosed implementations.

FIG. 5 is a flowchart showing a process 500 for decoding a video bitstream in accordance with disclosed implementations. Process 500 can be performed by a decoding computing device 14 for example to reduce jitter in decoding the video bitstream 322. The flowchart diagram in FIG. 5 shows several operations included in process 500. Process 500 can be accomplished with the operations included herein or with more or fewer operations than included here. For example, operations can be combined or divided to change the number of operations performed. The operations of process 500 can be performed in the order included herein or in different orders and still accomplish the intent of process 500. Process 500 can be performed by various processing stages shown in FIGS. 8A, B, which are described immediately below, and then discussed in the context of the process 500 shown in FIG. 5.

Figure 8A:
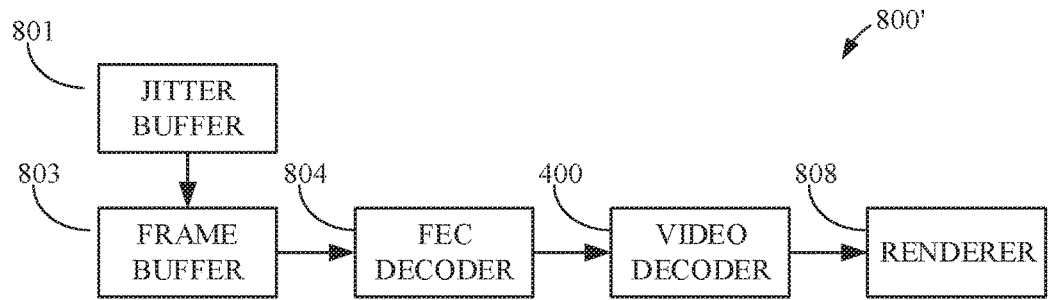
FIG. 8A is a block diagram of a system for video decoding processing using a separate jitter buffer and frame buffer.

FIGS. 8A, B are diagrams of a decoder 800' and 800. In the decoder 800' of FIG. 8A, a jitter buffer 801 is used to stabilize the received packets containing the frame data, and the reduced jitter frames are then provided to a frame buffer 803, and from there the signal is fed into an FEC decoder 804. However, utilizing both the jitter buffer 801 and the frame buffer 803 can introduce an undesirable delay into the signal that is subsequently sent to the FEC decoder 804.

Figure 8B:
FIG. 8B is a block diagram of a system for video decoding processing using a circular buffer in accordance with aspects of disclosed implementations.

Thus, FIG. 8B provides an advantageous application in which only a circular buffer 802 is used to buffer the packet data and to feed data into the FEC decoder 804, after which the FEC decoded signal is sent to a video decoder 806 and a render 808. The circular buffer 802 can receive packets of frames 204 of an encoded video bitstream 322 and temporarily store the packets. The circular buffer 802 can transmit frames 204 of encoded video bitstream data to the FEC decoder 804. The FEC decoder can detect and correct missing or corrupt packets of the encoded video bitstream 322 and emit frames 204 of encoded video bitstream data to the video decoder 806. Video decoder 806 can be a video decoder as shown in FIG. 4, for example. Video decoder 806 transmits frames of decoded video data to video renderer 808 to be rendered and displayed on a display 25 operatively connected to computing device 14, for example.

At operation 510, one or more packets associated with frames 204 of an encoded video bitstream 322 are received at the computing device. Receiving is defined herein as inputting, acquiring, reading, accessing or in any manner inputting an encoded video bitstream. The encoded video bitstream can be one that was encoded by computing device 12 using encoder 300 and transmitted via network 16, for example.

At operation 520, the packets associated with the encoded frame are stored in a memory of the computing device configured as a circular buffer. For example, the packets can be stored at a jitter buffer array, which can further include two or more circular buffers, and each of the circular buffers is configured to store packets associated with a single encoded frame at a point in time. The circular buffer is an exclusive storage location for the packets as they are assembled into the encoded frame, in which the jitter is reduced by storing packets in the mere location.

At operation 530, the circular buffer determines whether all packets associated with the encoded frame have been stored. If all packets, such as all necessary packets associated with the encoded frame, have been stored, the encoded frame is passed to a decoder to decode at operation 540; otherwise the process goes back to operation 510. The decoder can be a video decoder, or can comprise a FEC decoder and a video decoder connected in series. When decoded, each frame is assigned a display timestamp and stored at a render buffer of a renderer. The render buffer can be implemented to be a render buffer array that each render buffer within the array has the capability of storing a decoded frame at a point in time.

At operation 540, the decoded frame with the display timestamp is rendered by the renderer at the render buffer, at a speed that is faster than real time. The speed can be set to be potentially faster than real-time from, for example, the point of view of waiting time. For example, the decoded frame stored in the render buffer array is rendered at a speed slightly faster than real time. The speed is determined based on a difference between the display timestamp associated with the current decoded frame and a display timestamp associated with an immediately preceding frame.

Figure 6:
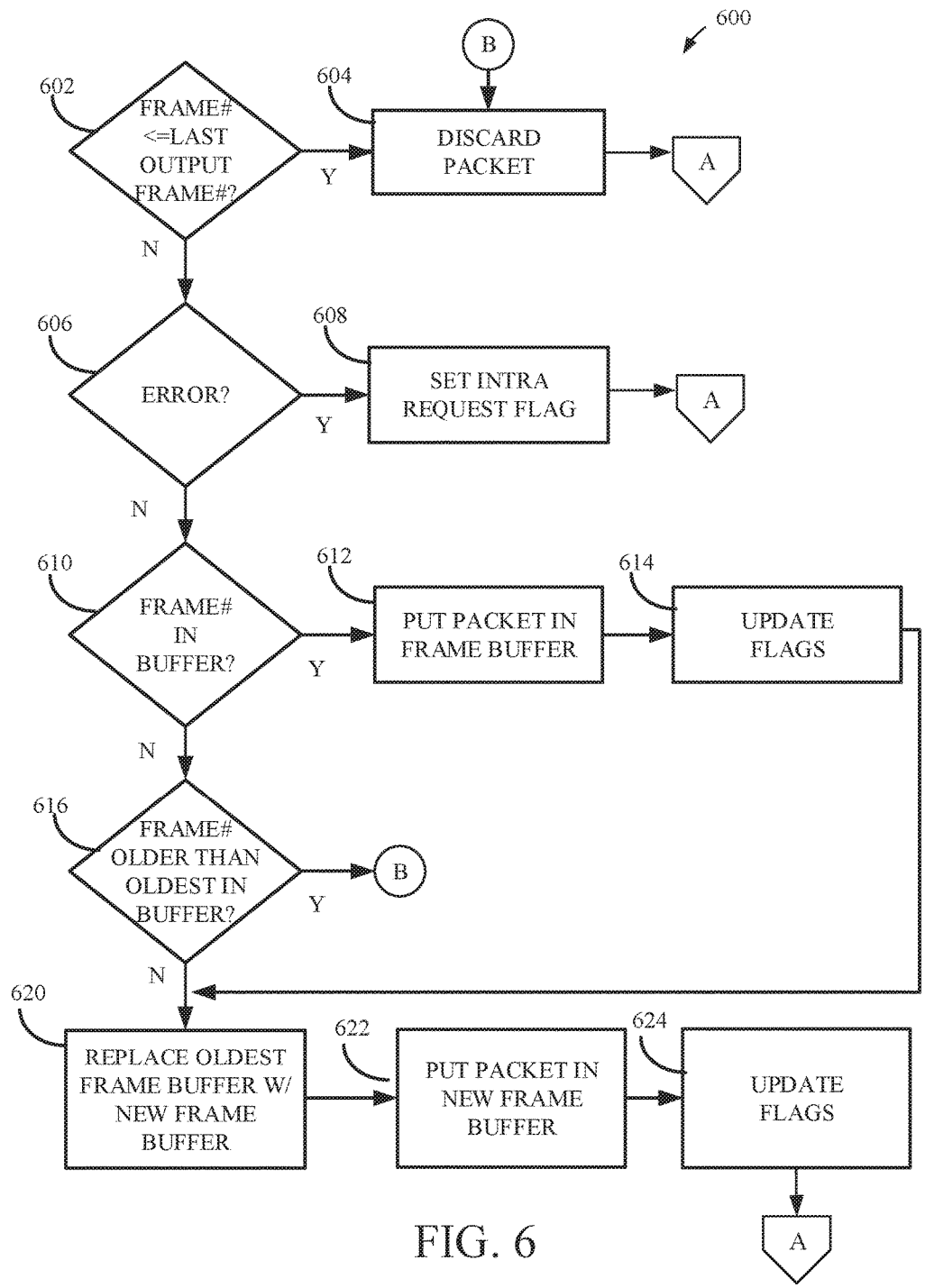
FIG. 6 is a flowchart showing operation of a frame buffer in accordance with aspects of disclosed implementations.

FIG. 6 is a flowchart diagram of a process 600 for the decoder for associating one or more frames 204 with the one or more packets. FIG. 6 begins at operation 602 by examining the one or more received packets and associating a frame number with the one or more received packets. When packets are formed by and encoder 300, they are marked to identify the frame with which they are associated. Upon receipt of the one or more packets, the packets can be examined and the frame number of the frame with which they are associated can be determined. At operation 602 the associated frame number is examined and checked against the frame numbers of the frames currently stored at the circular buffer 802. If the associated frame number is less than or equal to the frame number of the last frame output from the circular buffer 802, 602:Y, the one or more packets are discarded at operation 604 and process 600 returns to operation 504 of process 500.

If the associated frame number is greater than the frame number of the last frame output from the circular buffer 802, 602:N, at operation 606, the circular buffer 802 can check the network and determined if a network error has occurred. Network errors can include missing packets, which can be determined by packet sequence numbers associated with each packet being received out of order, for example. Network errors can also be detected by the network 16 or computing devices 12 or 14 and the error information passed to the circular buffer 802. If there is an error 606:Y, at operation 608 the circular buffer 802 can set an intra request flag to request re-transmission of missing or corrupt data buy sending an out of band message to the encoder 300. Following this the process 600 can return to operation 504 of process. At operation 610, the process 600 can check the associated frame number to determine if the frame associated with the one or more packets is currently stored in the circular buffer 802.

Figure 9:
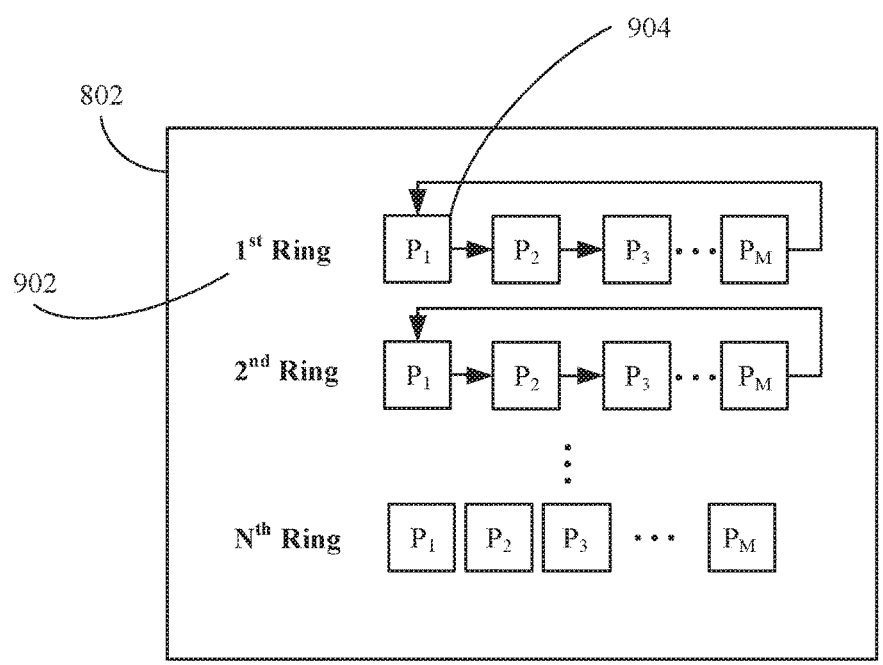
FIG. 9 is a block diagram of a circular buffer in accordance with aspects of disclosed implementations.

FIG. 9 is a diagram of circular buffer 802 that is described here to assist in understanding the remaining operations of the process 600. Circular buffer 802 includes a plurality of frames stored in ring/circular (or FIFO) buffers 902 that can serve the function of the combined jitter buffer 801 and frame buffer 803 described with respect to FIG. 8A. Circular buffer 802 includes circular (frame) buffers 902 1 through N, each circular buffer 902 being operative to store a frame identified by a frame number. Each circular buffer 902 includes a plurality of packets 904, identified as packets P1 through $P_M$. Circular buffer 802 can store a plurality of frames in circular buffers 902 and add received packets 904 to the appropriate circular buffer 902.

Returning to FIG. 6, if there is a frame number associated with the one or more packets in the circular buffer 802, 610:Y, then at operation 612, the one or more packets received by the circular buffer 802 and associated with the frame number currently being stored in the circular buffer 802 are stored in the appropriate circular buffer 902. At operation 614, flags associated with the circular buffer 802 are updated to reflect the state of the associated frame. Updated flags can include "all_data_packets" flags and "this_frame_is_ready" flags which indicate the status of each frame in the circular buffer 802. The circular buffer 802 can determine whether to output frames depending, at least in part, upon the state of the flags. Following updating flags, process 600 can progress to operation 620 to output frames.

If, at operation 610 it is determined that the associated frame number is not in the circular buffer 802, 610:N, then at operation 616, the associated frame number is checked to see if it older than the oldest frame number in the circular buffer 802. This can be the case if packets are received out or order or are being re-transmitted, for example. If it is 616:Y, the frame associated with the packet has already been output to the FEC decoder 804, and the one or more packets are discarded 604. The process 600 can then return to operation 504 of process 500.

If at operation 616 it is determined that the packet is not older than the oldest frame number in the circular buffer 802, 616:N, at operation 620, the oldest circular/frame buffer 902 in the circular buffer 802 is replaced with a new circular/frame buffer 902 bearing the associated frame number of the one or more packets. At operation 622 the one or more packets 904 are stored in the new frame buffer 902, and at operation 624 the "all_data_packets" and "this_frame_is_ready" flags are reset or updated. Process 600 can then return to operation 504 of process 500.

Figure 7:
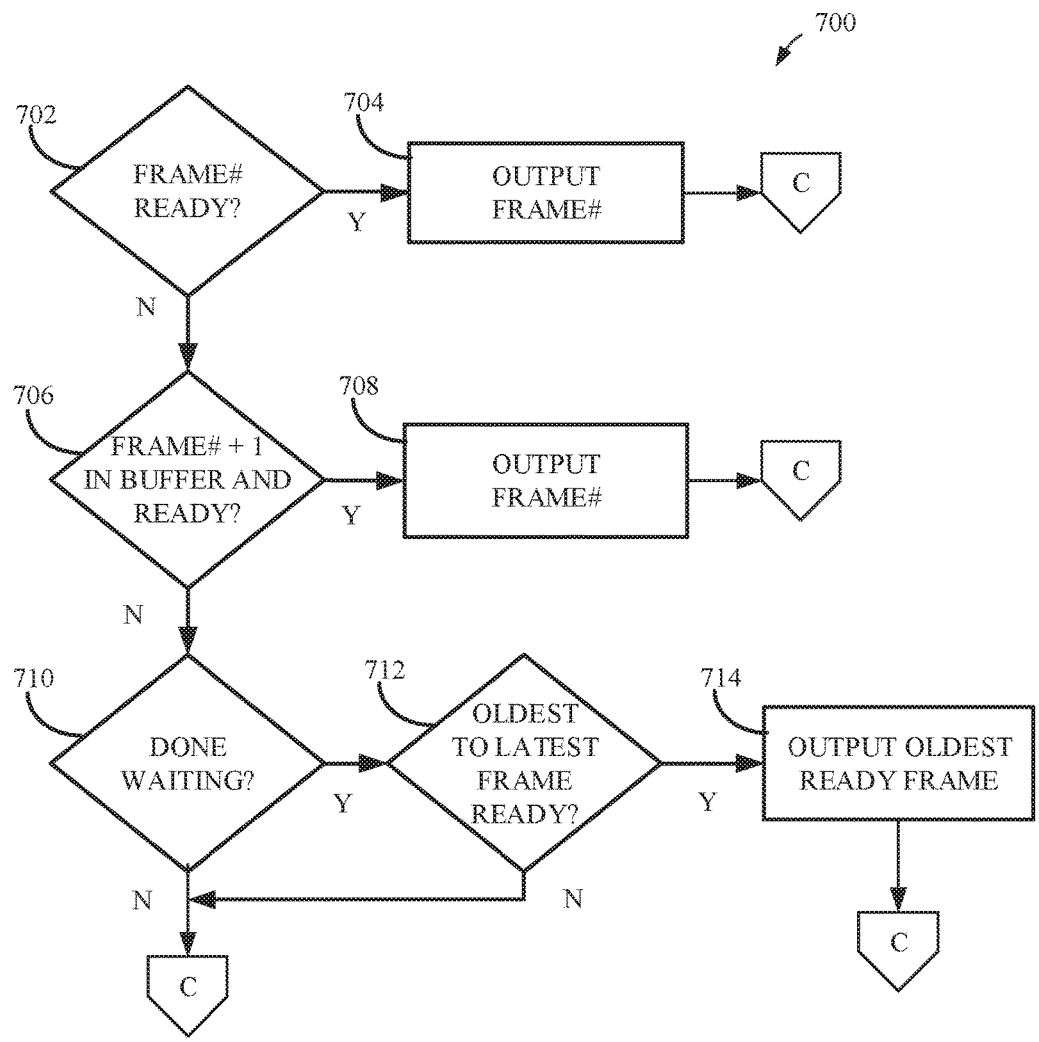
FIG. 7 is a flowchart showing operation of a frame buffer in accordance with aspects of disclosed implementations.

Returning to FIG. 5, at operation 506 process can output frames from circular buffer 802 to the FEC decoder 804. FIG. 7 is a flowchart of a process 700 for determining whether to output the one or more frames from the circular buffer 802 to an FEC decoder 804 based on the one or more packets' frames. At operation 702, the status of the update flags that may have been updated in operations 614 and/or 624 are checked to see if the current frame is ready for output. If the current frame is ready 702:Y, and if the previous or next older frame has been output 702:Y, at operation 704, the frame is output to the FEC decoder 804. Following outputting the frame, process 700 returns to operation 506 of process 500.

If the current frame is not ready 702:N, then at operation 706, process 700 checks flags to determine if the frame number+1 or next newer frame number is ready for output. If the next newer frame is ready 706:Y, that frame is output 708, and process 700 returns to operation 506 of process 500. If the next newer frame is not ready for output 706:N, then operation 710 process checks to see if a predetermined period of time has expired. If the predetermined period of time has expired 710:Y, then the timer is reset and process 700 is done waiting, and at operation 712, the frames of the frame buffer from oldest to newest are checked to determine if they are ready for output. If a ready frame is found at operation 712:Y, then the oldest frame is output 714 to FEC decoder 804, and process 700 returns to operation 506 of process 500. If the predetermined period of time has not expired 710:N or no ready frame is found 712:N, the process 700 returns to operation 506 of process 500.

FIG. 8B illustrates a design promoting smooth rendering and latency reduction. Some video networking applications (e.g., FIG. 8A) can employ a bitstream (packet) jitter buffer 801 to smooth out the network jitter, i.e., variance in network delay. However, this jitter buffer 801 creates a permanent delay in the system.

In the design of FIG. 8B and FIG. 9, the circular buffer 802 combines the functionality of the packet jitter buffer 801 and a dedicated frame buffer 803 for joint jitter removal/reduction and latency reduction.

The packet jitter/circular buffer 802 employs a circular buffer array or circular buffers 902, with each circular buffer 902 holding one frame 206 worth of packets. Once there is a complete frame in the circular buffer 902 (as described above), then complete frame 206 formed from the combined packets is sent to the video decoder 400 to decode.

The decoder 400 decodes the bitstream as quickly as possible, and pushes the decoded frames into a render buffer array of the renderer 808 along with a display time stamp.

The renderer 808 then renders a frame 206 in its render buffer at a speed that is slightly faster than real time (based on the time stamp difference of the immediately previous frame and the current frame), where real time relates to a display speed of the frame.

The implementations of encoding and decoding described above illustrate some example encoding and decoding techniques. However, encoding and decoding, as those terms are used in the claims, could mean compression, decompression, transformation, or any other processing or change of data.

The words "example" or "example" are used herein to mean serving as an example, instance, or illustration. Any aspect or design described herein as "example" is not necessarily to be construed as preferred or advantageous over other aspects or designs. Rather, use of the words "example" or "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

The implementations of computing devices 12, 14, 26 and/or 28 and the algorithms, methods, instructions, and such stored thereon and/or executed thereby can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" encompasses any of the foregoing hardware, either singly or in combination. The terms "signal" and "data" are used interchangeably. Further, portions of computing devices 12, 14, 26 and/or 28 do not necessarily have to be implemented in the same manner.

Further, in one implementation, for example, computing devices 12, 14, 26 and/or 28 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Computing devices 12, 14, 26 and/or 28 can, for example, be implemented on computers in a screencasting system. Alternatively, computing device 12 can be implemented on a server and computing devices 14, 26 and/or 28 can be implemented on a device separate from the server, such as a cell phone or other hand-held communications device. In this instance, computing device 12 can encode content using an encoder 300 into an encoded video signal and transmit the encoded video signal to the communications device. In turn, the communications device can then decode the encoded video signal using decoder 400. Alternatively, the communications device can decode content stored locally on the communications device, such as content that was not transmitted by computing device 12. Other suitable computing device 12, 14, 26 and/or 28 implementation schemes are available. For example, computing devices 14 can be a generally stationary personal computer rather than a portable communications device and/or a device including encoder 300 may also include decoder 400.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for reducing jitter in decoding a video bitstream with a computing device, comprising:
   receiving, at the computing device, one or more packets associated with an encoded frame in the video bitstream;
   based on a determination that at least one packet associated with the encoded frame is missing, reconstructing the at least one packet using other packets of the one or more packets associated with the encoded frame;
   storing the one or more packets associated with the encoded frame in a memory of the computing device, the memory configured as a circular buffer;
   in response to a determination that all packets associated with the encoded frame have been stored in the circular buffer, immediately decoding the encoded frame; and
   rendering the decoded frame at a render speed that is faster than a display speed of the decoded frame in real time, and the render speed is determined based on a difference between a display timestamp associated with the decoded frame and a display timestamp associated with an immediately preceding frame.

2. The method of claim 1, further comprising:
   in response to immediately decoding the encoded frame, storing the decoded frame at a render buffer array, wherein the decoded frame is stored with a display timestamp associated with the decoded frame.

3. The method of claim 1, further comprising:
   determining, by the computing device, whether all packets associated with the encoded frame have been stored in the circular buffer.

4. The method of claim 1, wherein the computing device comprises a forward error correction decoder and a video decoder connected in series.

5. The method of claim 1, wherein the memory comprises a jitter buffer array comprising a plurality of circular buffers, and each of the plurality of circular buffers is configured to store packets associated with a single encoded frame at a point in time.

6. The method of claim 2, wherein rendering the decoded frame at a speed that is faster than real time further comprises:
   rendering the decoded frame stored in the render buffer array at a speed slightly faster than real time.

7. The method of claim 1, wherein the circular buffer is an exclusive storage location for the one or more packets associated with the encoded frame.

8. An apparatus for reducing jitter in a video bitstream, comprising:
   a memory comprising storage structured as a circular buffer configured to receive one or more packets associated with an encoded frame included in the video bitstream; and
   a processor configured to execute instructions stored in the memory to:
     receive one or more packets associated with an encoded frame in the video bitstream;
     based on a determination that at least one packet associated with the encoded frame is missing, reconstruct the at least one packet using other packets of the one or more packets associated with the encoded frame;
     store the one or more packets associated with the encoded frame in the circular buffer;
     in response to a determination that all packets associated with the encoded frame have been stored in the circular buffer, immediately decode the encoded frame; and
     render the decoded frame at a render speed that is faster than a display speed of the decoded frame in real time, and the render speed is determined based on a difference between a display timestamp associated with the decoded frame and a display timestamp associated with an immediately preceding frame.

9. The apparatus of claim 8, wherein the processor is further configured to execute instructions to:
   in response to immediately decoding the encoded frame, store the decoded frame at a render buffer array, wherein the decoded frame is stored with a display timestamp associated with the decoded frame.

10. The apparatus of claim 8, wherein the processor is further configured to execute instructions to:
    determine whether all packets associated with the encoded frame have been stored in the circular buffer.

11. The apparatus of claim 8, wherein the circular buffer is an exclusive storage location for the one or more packets associated with the encoded frame.

12. The apparatus of claim 8, wherein the apparatus comprises a forward error correction decoder and a video decoder connected in series.

13. The apparatus of claim 8, wherein the memory comprises a jitter buffer array comprising a plurality of circular buffers, and each of the plurality of circular buffers is configured to store packets associated with a single encoded frame at a point in time.

14. A system for reducing jitter in decoding a video bitstream comprising:
    a forward error correction decoder;
    a video decoder configured to:
      receive one or more packets associated with an encoded frame in the video bitstream;
      based on a determination that at least one packet associated with the encoded frame is missing, reconstruct the at least one packet using other packets of the one or more packets associated with the encoded frame;
      store the one or more packets associated with the encoded frame in a circular buffer; and
      in response to a determination that all packets associated with the encoded frame have been stored in the circular buffer, immediately decode the encoded frame; and
    a renderer configured to render the decoded frame, wherein the rendering occurs at a render speed that is slightly faster than a display speed of the decoded frame in real time, and the render speed is determined based on a difference between a display timestamp associated with the decoded frame and a display timestamp associated with an immediately preceding frame.

15. The system of claim 14, wherein the video decoder is further configured to:
    in response to immediately decoding the encoded frame, store the decoded frame at a render buffer array, wherein the decoded frame is stored with the display timestamp associated with the decoded frame.

16. The system of claim 14, wherein the video decoder is further configured to:
   determine whether all packets associated with the encoded frame have been stored in the circular buffer.

17. The system of claim 14, wherein the circular buffer comprises a jitter buffer array comprising a plurality of circular buffers, and each of the plurality of circular buffers is configured to store packets associated with a single encoded frame at a point in time.

* * * * *